United States Patent [19]

Schmidt

[11] Patent Number: 5,301,708

[45] Date of Patent: Apr. 12, 1994

[54] ROTARY PLUG VALVE ACTUATOR AND ASSOCIATED ROTARY PLUG VALVE AND ASSOCIATED METHOD

[75] Inventor: George C. Schmidt, Port Lavaca, Tex.

[73] Assignee: Aluminum Company of America, Pittsburgh, Pa.

[21] Appl. No.: 15,603

[22] Filed: Feb. 9, 1993

[51] Int. Cl.$^5$ .......................................... F16K 31/50
[52] U.S. Cl. .................................... 137/15; 74/18.1; 74/25; 74/89.15; 74/424.8 VA; 137/315; 251/229; 251/264; 251/335.3
[58] Field of Search .............. 74/18.2, 89.15, 424.8 R, 74/424.8 VA, 25, 18.1, 20; 251/229, 264, 279, 335.3, 231, 266; 137/556

[56] References Cited

U.S. PATENT DOCUMENTS

| | | | |
|---|---|---|---|
| 2,908,182 | 10/1959 | Bacchi | 74/89.15 |
| 2,930,252 | 3/1960 | Sears et al. | 74/424.8 VA |
| 3,011,359 | 12/1961 | Morrell | 251/264 |
| 3,043,160 | 7/1962 | Killian | 251/229 |
| 3,063,298 | 11/1962 | Elliott | 251/229 |
| 3,339,892 | 9/1967 | Dixon | 74/424.8 VA |
| 3,395,886 | 8/1968 | Fawkes | 251/229 |
| 3,628,397 | 12/1971 | Sheesley | 74/625 |
| 3,679,172 | 7/1972 | Kerkau | 251/229 |
| 3,774,462 | 11/1973 | Thompson | 74/424.8 VA |
| 4,023,432 | 5/1977 | Killian | 74/424.8 VA |
| 4,065,979 | 1/1978 | Killian | 74/424.8 R |
| 4,128,019 | 12/1978 | Kupka | 74/424.8 VA |
| 4,802,652 | 2/1989 | Kaniut et al. | 251/181 |
| 4,878,652 | 11/1989 | Wordin | 251/181 |
| 4,883,409 | 11/1989 | Strohmeier et al. | 417/43 |
| 4,909,716 | 3/1990 | Orosz et al. | 418/201 |
| 4,930,541 | 6/1990 | Solberg | 137/875 |
| 4,930,748 | 6/1990 | Gonsior | 251/163 |
| 4,932,311 | 6/1990 | Mibu et al. | 91/361 |
| 4,938,090 | 7/1990 | Brusasco | 74/424.8 R |
| 4,951,519 | 8/1990 | Ohtsuka | 74/425 |
| 4,953,418 | 9/1990 | Hirose | 74/424.8 A |
| 5,036,886 | 8/1991 | Olsen et al. | 137/625.65 |
| 5,037,065 | 8/1991 | Hirz et al. | 251/214 |
| 5,046,376 | 9/1991 | Baker | 74/424.8 |

OTHER PUBLICATIONS

Nook Industries Product Literature for "Power-Trac", Copyright 1991, Nook Industries.

Warner Electric Product Literature for Ball Bearing Screws, Copyright 1983.

Primary Examiner—George L. Walton
Attorney, Agent, or Firm—David V. Radack; Glenn E. Klepac

[57] ABSTRACT

A rotary plug valve actuator comprising a mounting bracket, a ball screw mechanism pivotably mounted to the mounting bracket and a lever pivotably mounted to the ball screw mechanism. The ball screw mechanism includes a ball screw shaft and a ball nut. The ball nut moves axially on the ball screw shaft when the ball screw shaft is rotated. The lever converts the axial movement of the ball nut to rotary motion. In that way, rotation of the ball screw shaft will in turn actuate the rotary plug valve. An associated rotary plug valve assembly and an associated method of actuating a rotary plug valve are also provided.

31 Claims, 3 Drawing Sheets

ROTARY PLUG VALVE ACTUATOR AND ASSOCIATED ROTARY PLUG VALVE AND ASSOCIATED METHOD

BACKGROUND OF THE INVENTION

This invention relates to an actuator for a rotary plug valve (or rotary ball valve) which utilizes a ball screw mechanism. An associated rotary plug valve having the rotary plug valve actuator and an associated method are also disclosed.

Rotary plug valves and rotary ball valves are well known and have wide application in the control of fluids in various industrial settings. The construction of the rotary plug valve usually takes the form of a cast valve body that defines an enclosed valve seat having both inlet and outlet ports. In a conventional ball valve, a spherical ball is rotatably placed in the valve seat, the spherical ball having a passageway through its diameter to provide for the flow of fluid from the inlet to the outlet side of the valve. A plug valve is constructed similarly, only the plug is not spherical. See U.S. Pat. No. 4,802,652, the disclosure of which is incorporated by reference herein.

The ball or plug is rotated by means of an operator mechanism, sometimes called an actuator. One type of actuator is shown in U.S. Pat. No. 4,802,652 which simply provides a handle for applying torque to the ball or plug. For larger plug or ball valves, a mechanism is typically used to apply the torque. One known mechanism is a worm gear actuator. As is well known, the worm gear mechanism consists of a screw shaft ("worm") which is engaged by a rotating gear.

The worm gear mechanism, while effective in increasing the mechanical advantage of the actuator, has numerous disadvantages. A first disadvantage is that the worm gear mechanism involves sliding motion between the worm and the gear. This means that much of the torque applied to the gear is lost due to friction, thus making the worm gear mechanism, even when new, difficult to turn. Of course, as the worm gear mechanism ages and rusts, it is even more difficult to turn. A second disadvantage is that the worm and gear are often exposed to dust, dirt and moisture, making it difficult to keep lubricant thereon with the attendant greater difficulty in turning the worm gear mechanism.

A ball screw mechanism is a known mechanical device that consists of a rotatable shaft having disposed thereon a ball screw nut. See, e.g., U.S. Pat. No. 3,628,397; Warner Electric Catalog (1983); and Noor Industries Catalog (1991), the disclosures of all three of which are incorporated herein by reference. The ball screw mechanism uses rolling contact (similar to ball bearings) instead of the sliding contact utilized in the worm gear mechanism. Thus, the ball screw mechanism is much more efficient than the worm gear mechanism.

Despite the long existence of the ball screw mechanism, no one, until now, has suggested its use in association with ball or plug valves.

Thus, there remains a need for a rotary valve actuator that is efficient and avoids the problems of the prior art worm gear mechanism.

SUMMARY OF THE INVENTION

The rotary plug valve actuator disclosed and claimed herein satisfies the above-mentioned needs. The rotary plug valve actuator comprises a mounting bracket, a ball screw mechanism pivotably mounted to the mounting bracket and a lever pivotably mounted to the ball screw mechanism. The ball screw mechanism includes a ball screw shaft and a ball nut. The ball nut moves axially on the ball screw shaft when the ball screw shaft is rotated. The lever converts the axial movement of the ball nut to rotary motion. In that way, rotation of the ball screw shaft in turn actuates the rotary plug valve.

The invention also comprehends a rotary plug valve assembly comprising a rotary plug valve having an inlet portion, a valve seat, an outlet portion and a plug valve disposed in the valve seat. The assembly further comprises a rotary plug valve actuator similar to that described above.

Finally, a method of actuating a rotary plug valve is disclosed in which a rotary plug valve assembly including a rotary plug valve having mounted thereon a rotary plug valve actuator is provided. The rotary plug valve actuator is similar to that described above. The method further comprises rotating the ball screw shaft to actuate the rotary plug valve.

BRIEF DESCRIPTION OF THE DRAWINGS

A full understanding of the invention can be gained from the following description of the preferred embodiment when read in conjunction with the accompanying drawings in which.

DETAILED DESCRIPTION

Figure 1:
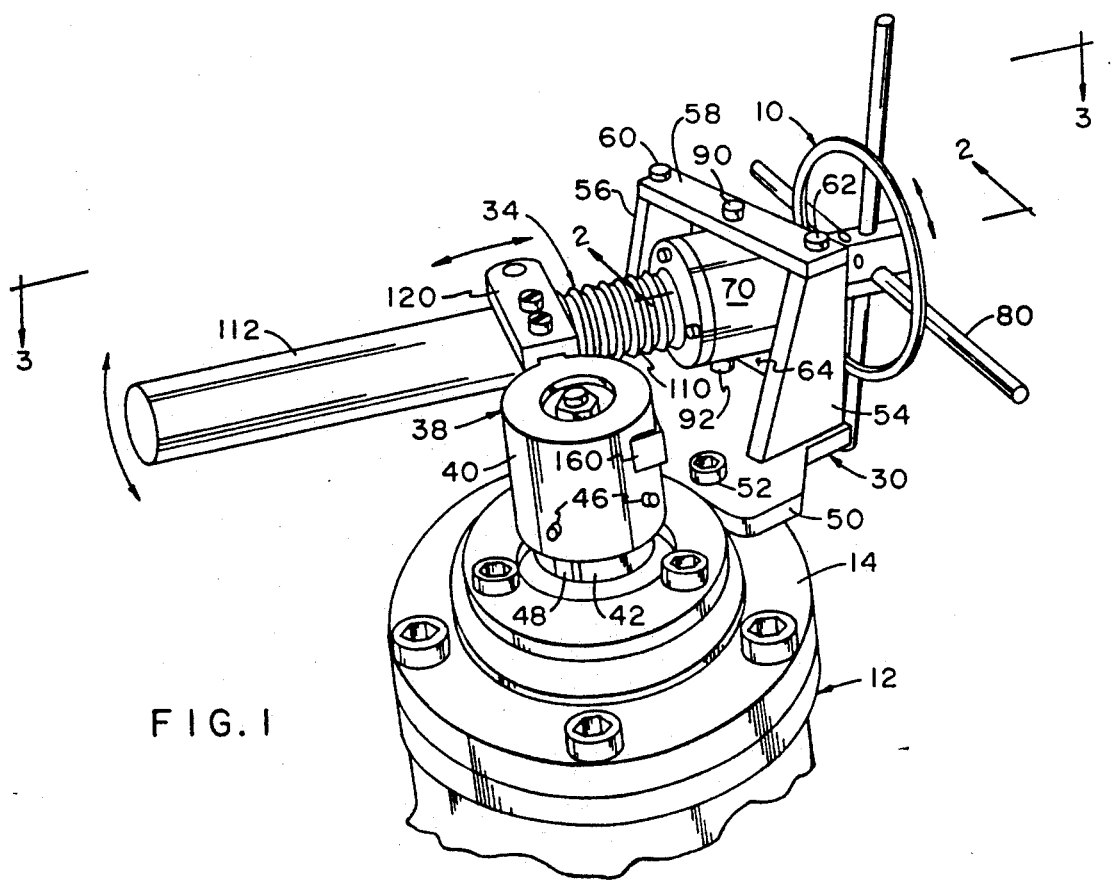
FIG. 1 is a perspective view of the rotary plug valve actuator mounted on a rotary plug valve.
Figure 2:
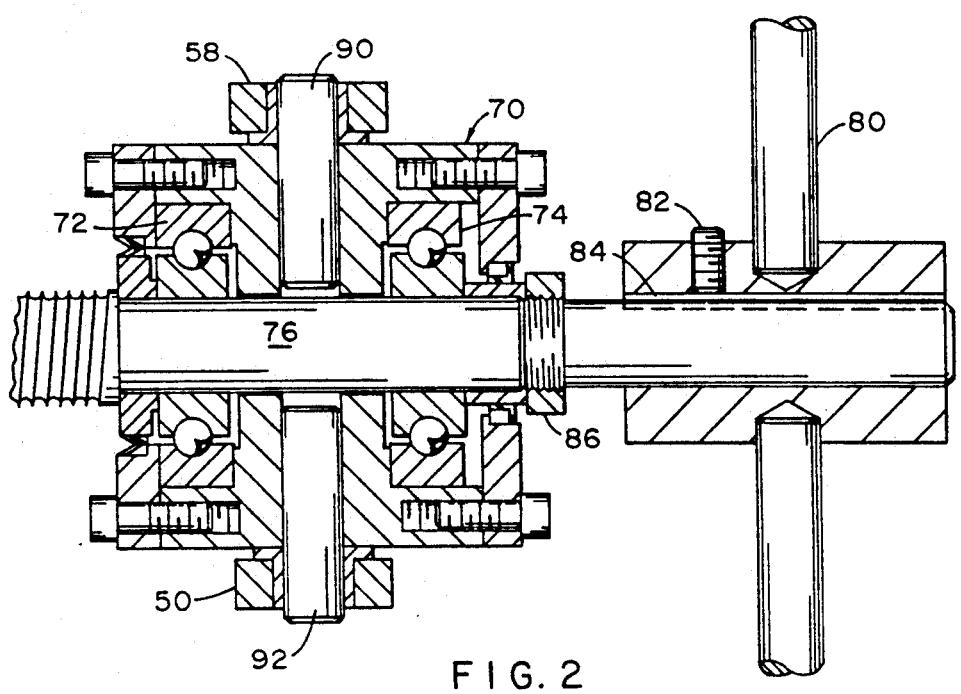
FIG. 2 is a cross-sectional view taken along line 2—2 of FIG. 1.
Figure 3:
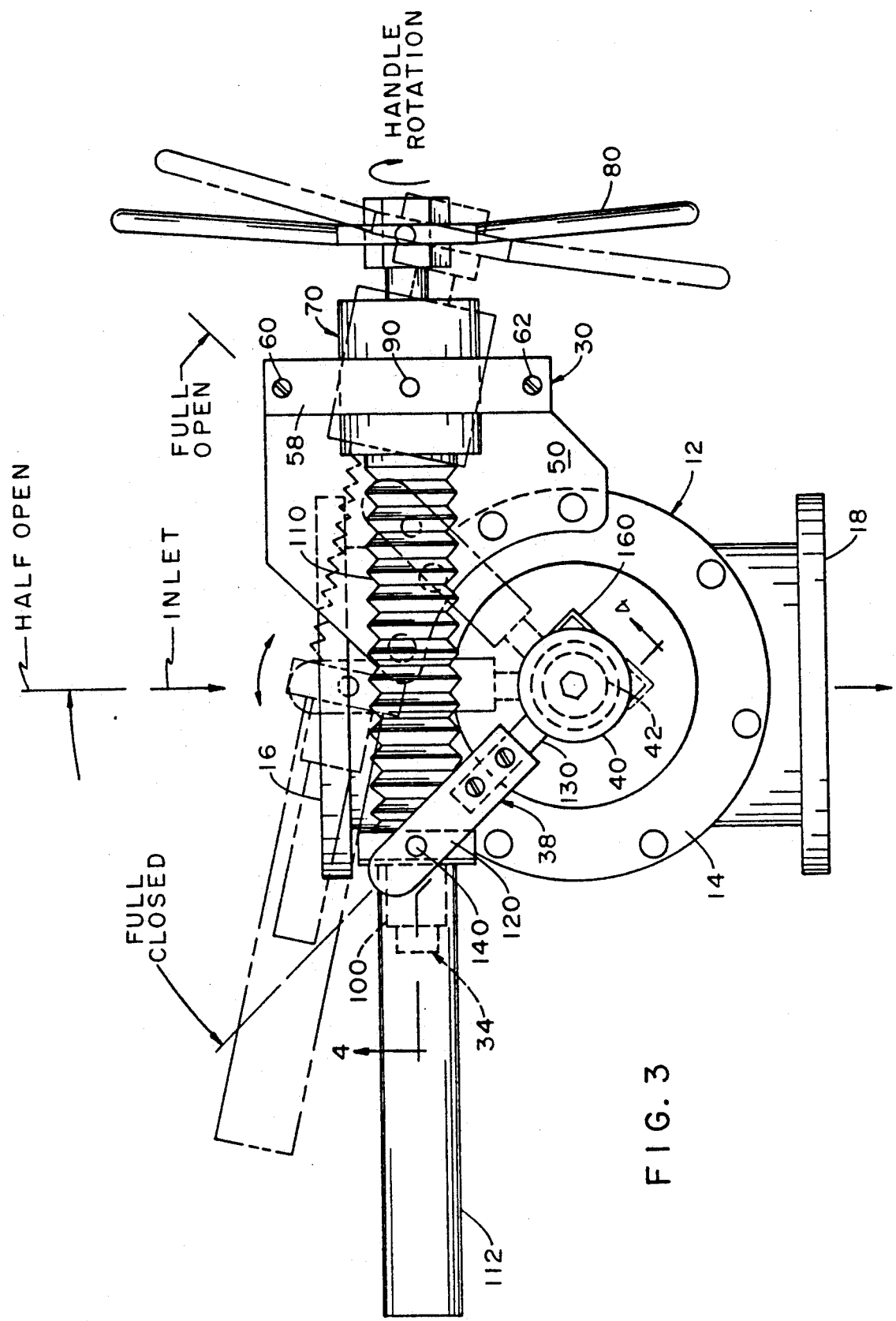
FIG. 3 is a top plan view of the rotary plug valve actuator showing the different positions of the actuator in phantom lines.

Referring now to FIGS. 1-4, a rotary plug valve actuator 10 in accordance with the invention is shown mounted on a rotary plug valve 12. As the rotary plug valve 12 is conventional and well known in the art, it is not shown in full in FIG. 1. It will be appreciated, though, that the rotary plug valve 12 includes a valve body 14 that defines a valve seat (not shown) having an inlet port 16 and an outlet port 18 (FIG. 3). A plug (not shown) defining a transverse passageway is mounted in the valve seat. As is well known, fluid flow through the valve 12 is permitted when the plug is in an open position; i.e., when the passageway is provided between the inlet and outlet port. The valve is closed by rotating the plug to the closed position, i.e., when the passageway is generally perpendicular to the inlet and outlet ports, so that fluid is not able to flow through the passageway.

It will be appreciated that although the invention is described as a rotary plug valve actuator that it also can be used in association with a rotary ball valve actuator. Thus, as used herein, the term "rotary plug valve" includes rotary ball valves or any other types of rotary valves having the same function and operation as a rotary plug valve.

Referring now specifically to FIG. 1, the rotary plug valve actuator 10 comprises a mounting bracket 30, a ball screw means 34 pivotably mounted to the mounting bracket 30 and a lever means 38 pivotably mounted to the ball screw means 34. The lever means 38 consists of a collar 40 which is secured to a shaft 42 that extends from the valve plug (not shown) through the upper portion of the valve body 14. The collar 40 is aligned to fit over a key 48 and is secured to the shaft 42 by set screws 46, two of which are shown in FIG. 1. It will be appreciated that the rotary motion of the lever means 38 is transmitted through the collar 40 in order to rotate the shaft 42. This in turn rotates the valve plug into different positions (i.e., from fully open to fully closed or positions therebetween) as is explained in further detail below with respect to FIG. 3.

The mounting bracket 30 consists of a horizontal flange 50 which is bolted to the valve body 14 by means of bolts, one of which, bolt 52, is shown in FIG. 1. Two spaced apart vertical supports 54 and 56 are secured to the flange 50, as by welding, and cross member 58 is secured to the upper portion of the vertical supports 54 and 56 by means of bolts 60 and 62, respectively. The flange 50, vertical supports 54, 56 and cross member 58 form a space 64 in which the ball screw means 34 is mounted and can be rotated therein. It will be appreciated by those skilled in the art that a variety of structures or types of mounting brackets may be provided.

Referring to FIG. 2, the ball screw means 34 includes a bearing housing assembly 70. The bearing housing assembly has two bearings 72 and 74 in which the shaft 76 of the ball screw means 34 is journalled.

A handle assembly 80, which is shown in FIG. 1 as a wheel having spokes, is mounted at one end of the shaft 76 by means of a set screw 82. A key 84 is preferably provided to align the handle assembly 80 to the shaft 76. The ball screw shaft 76 is affixed and held in position to the bearing housing by means of a locknut 86.

As can be seen in FIGS. 1 and 2, the bearing housing assembly 70 is pivotably mounted to the mounting bracket 30 about a pivot line or axis defined by upper pivot pin 90 and a lower pivot pin 92. This mounting arrangement permits the bearing housing assembly 70 and thus the ball screw means 34 to pivot in space 64 when the valve actuator is operated, as is explained below with respect to FIG. 3. The pivot pins 90 and 92 are disposed along a line or axis generally parallel with the axis of rotation of the rotary plug valve.

Figure 4:
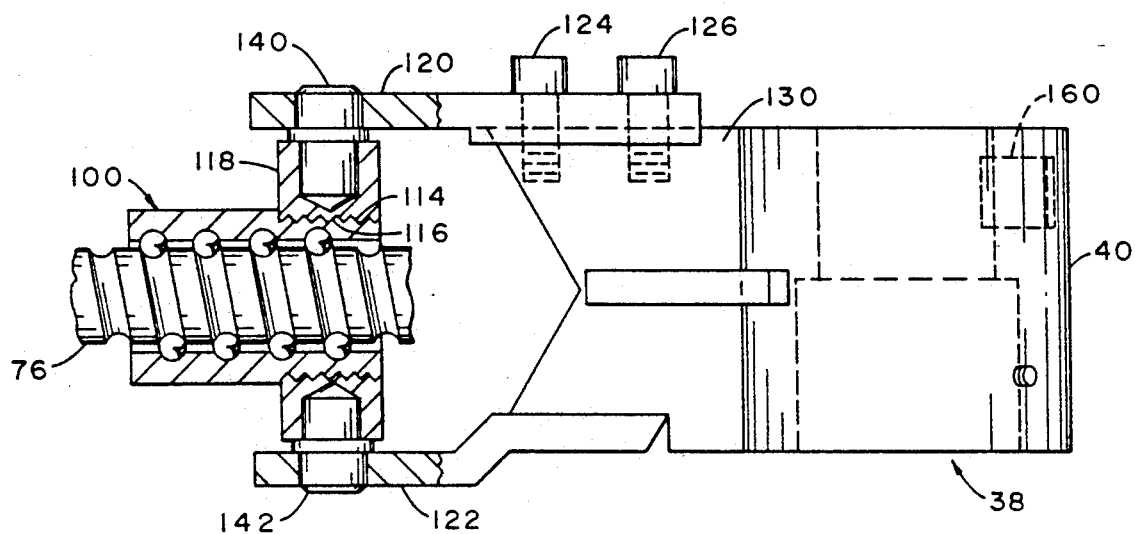
FIG. 4 is a cross-sectional view taken along line 4—4 of FIG. 3.

The ball screw means 34 further consists of the ball screw shaft 76 and a ball screw nut 100, which is shown in phantom in FIG. 3 and in cross-section in FIG. 4. The ball screw shaft 76 and ball screw nut 100 make up a well known mechanical device that converts the rotation of the ball screw shaft 76 into the linear motion of the ball screw nut 100. Such a mechanical device is manufactured by Warner Electric, Troy, Michigan (see Warner Electric Catalog (1983), which is incorporated herein by reference).

The ball screw means 34 further consists of a bellows assembly 110 to protect the ball screw shaft 76 and a shaft cover 112 that receives and protects the shaft 76 when it is in its extend position (see FIG. 3).

Referring now to FIG. 4, the ball screw nut 100 is shown mounted to the lever means 38 by means of screw threads 114 disposed on the ball screw nut 100 which are complementary to threads 116 on horizontal member 118 of the lever means 38. The lever means 38 includes a top lever arm 120 and a bottom lever arm 122. The arms 120, 122 are secured by screws, such as screws 124, 126, to a bar 130 which in turn is mounted, as by welding, to the shaft collar 40. The free edge of the arms 120, 122 are pivotably mounted to the ball screw nut 100 by means of pivot pins 140, 142. The pivot pins 140, 142 are disposed on a line generally parallel with the axis of rotation of the rotary plug valve.

Referring now to FIG. 3, the operation of the valve actuator is explained. As shown in solid lines, when the plug valve is closed, the lever means 38 is positioned furthest to the left, i.e., in a position furthest from the bearing housing assembly 70. It will be appreciated that the plug valve could be operated in the opposite direction, i.e., open when the lever means is positioned furthest to the left and closed when the lever means is furthest to the right. In order to close the plug valve, the handle assembly 80 is rotated, thus rotating the ball screw shaft 76 which in turn creates linear motion of the ball screw nut 100. As can be seen by the phantom lines in FIG. 3, this motion causes the lever means 38 to rotate about the plug valve shaft axis toward the bearing housing assembly 70 to the middle or half open position. In order to accommodate this movement, the ball screw means 34 rotates about pivot pins 90 and 92 to the position shown in phantom on FIG. 3. This is accomplished because the bearing housing assembly 70 is pivotably mounted to the mounting bracket and the lever means 38 is pivotably mounted to the ball screw means 34.

Further rotation of the handle assembly 80 fully opens the plug valve. The lever means 38 is in the furthest right position (i.e., closest to the bearing housing assembly 70) shown on FIG. 3, with the ball screw means position (not shown) being in the same alignment as when the plug valve is in the fully closed position. It will be appreciated that the ball screw means 34 has an axis of rotation disposed in a plane that is generally perpendicular to a plane including the axis of rotation of the rotary plug valve.

In order to indicate the position of the plug valve, an indicator 160 is mounted on the shaft collar 40. The indicator 160 points in the direction of the passageway of the plug valve. As shown in FIG. 3, the indicator 160 shows that the passageway is oriented perpendicularly to the fluid flow, thus the plug valve is closed. Once the plug valve is fully opened, the shaft collar 40 and thus the indicator is rotated 90°, as shown in phantom in FIG. 3. In the fully opened position, the passageway is oriented generally parallel to the fluid flow, thus the plug valve is indicated by the position of the indicator to be opened.

EXAMPLE

In order to illustrate the advantages of the invention, the torque required to rotate a conventional worm gear actuator was compared to the torque required to rotate the rotary plug valve actuator of the invention. A conventional worm gear actuator was separately mounted to three separate valves and the torque required to rotate these valves was measured. Two sets of experiments were run, the first with the gears in a dry or non-lubricated state and the second with the gears being lubricated. The rotary plug valve actuator of the invention was separately mounted to each of the same three valves and the torque required to rotate the valve was measured.

The results of the experiment are reported below:

|  | Torque (in ft-lbs) | | |
| --- | --- | --- | --- |
|  | Worm Gear Actuator | | Rotary Plug |
|  | Dry | Lubed | Valve Actuator |
| Valve #1 | 50–55 | 30–40 | 5–10 |

|  | Torque (in ft-lbs) | | |
| --- | --- | --- | --- |
|  | Worm Gear Actuator | | Rotary Plug |
|  | Dry | Lubed | Valve Actuator |
| Valve #2 | 300-350 | 230-240 | 75-90 |
| Valve #3 | 65-75 | 35-45 | 1-5 |

As can be seen from the above results, the rotary plug valve actuator requires on the average from 70–80% less torque to rotate the valve than the conventional worm gear actuator.

While the invention has been described in terms of preferred embodiments, the claims appended hereto are intended to encompass all embodiments which fall within the spirit of the invention.

What is claimed is:

1. A rotary plug valve actuator for use with a rotary plug valve comprising:
   a mounting bracket removably secured to a portion of said rotary plug valve;
   ball screw assembly means, said ball screw assembly means including (i) a bearing housing pivotably mounted to said mounting bracket by pivot means connecting said mounting bracket to said bearing housing; (ii) a ball screw shaft journalled in said bearing housing; (iii) a ball nut means, said ball nut means moving axially on said ball screw shaft when said ball screw shaft is rotated; and (iv) actuating means for rotating said ball screw shaft, whereby when said actuating means is actuated, said ball screw assembly means pivots at said pivot means; and
   lever means pivotably mounted to said ball nut means and adapted for securement to said rotary plug valve, said lever means converting said axial movement of said ball nut means to rotary movement of said lever means as a result of said ball screw assembly means being pivoted about said pivot means within said mounting bracket, whereby said rotary plug valve can be actuated by rotating said ball screw shaft means.

2. The actuator of claim 1, wherein
said lever means includes a first arm extending radially from a first portion of said ball nut means and a second arm extending radially from a second portion of said ball nut means, said second portion being disposed in longitudinal alignment with said first portion.

3. The actuator of claim 2, including
a first pivot pin connecting said first arm to said ball nut means and a second pivot pin axially aligned with said first pivot pin connecting said second arm to said ball nut means.

4. The actuator of claim 3, wherein
said pivot means includes a third pivot pin connecting a first portion of said bearing housing to said mounting bracket and a fourth pivot pin axially aligned with said third pivot pin connecting a second portion of said bearing housing to said mounting bracket, said second portion being disposed in longitudinal alignment with said first portion.

5. The actuator of claim 4, wherein
said first and second pivot pins are disposed along a line generally parallel with the axis of rotation of said rotary plug valve; and said third and fourth pivot pins are disposed along a line generally parallel with the axis of rotation of said rotary plug valve.

6. The actuator of claim 5, wherein
said ball screw assembly means having an axis of rotation disposed in a plane that is generally perpendicular to a plane including the axis of rotation of said rotary plug valve.

7. The actuator of claim 6, wherein
said ball nut means includes a ball screw nut in operative association with said ball screw shaft.

8. The actuator of claim 7, wherein
said first and second pivot pins are connected to said ball screw nut.

9. The actuator of claim 8, wherein
said mounting bracket includes (i) a flange adapted to be secured to said rotary plug valve; (ii) a first support extending generally perpendicularly from said flange; (iii) a second support extending generally perpendicularly from said flange and spaced from said first support an adequate distance to allow retention of said bearing housing therebetween; and (iv) a cross member having one end secured to said first support and a second end secured to said second support.

10. The actuator of claim 9, wherein
said third pivot pin is secured to said cross member and said fourth pivot pin is secured to said flange.

11. The actuator of claim 10, including
a ball screw shaft cover secured to one end of said ball nut means for protecting a portion of said ball screw shaft; and
a ball screw shaft bellows secured to the other end of said ball nut means for protecting another portion of said ball screw shaft.

12. The actuator of claim 1, wherein
said actuating means is a handle secured to one end of said ball screw shaft for facilitating rotation of said ball screw shaft.

13. The actuator of claim 12, wherein
said handle is a wheel having spokes.

14. The actuator of claim 1, including
indicator means disposed on said lever means to indicate the position of said rotary plug valve.

15. A rotary plug valve assembly comprising:
a rotary plug valve including:
   an inlet portion;
   a valve seat;
   an outlet portion;
   a rotary plug disposed in said valve seat; and
   said rotary plug having a passageway and a shaft extending outwardly from said rotary plug valve; and
a rotary plug valve actuator in operative association with said rotary plug valve, said actuator including:
   a mounting bracket removably mounted on a portion of said rotary plug valve;
   ball screw assembly means, said ball screw assembly means including (i) a bearing housing pivotably mounted to said mounting bracket by pivot means connecting said mounting bracket to said bearing housing; (ii) a ball screw shaft journalled in said bearing housing; (iii) a ball nut means, said ball nut means moving axially on said ball screw shaft when said ball screw shaft is rotated; and (iv) actuating means for rotating said ball screw shaft, whereby when said actuating means is actuated, said ball screw assembly means pivots at said pivot means; and lever means having one end portion pivotably mounted to said ball nut means and the opposite end secured to said rotary plug shaft, said lever means converting said axial movement of said ball nut means to rotary movement of said lever means as a result of said ball screw assembly means being pivoted about said pivot means within said mounting bracket, whereby said rotary plug shaft and said rotary plug valve can be actuated by rotating said ball screw shaft.

16. The assembly of claim 15, wherein said lever means includes (i) a collar secured to said rotary plug shaft; (ii) a first arm extending radially from a first portion of said ball nut means and mounted to said collar; and (iii) a second arm extending radially from a second portion of said ball nut means and mounted to said collar, said second portion being disposed in longitudinal alignment with said first portion.

17. The assembly of claim 16, including a first pivot pin connecting said first arm to said ball nut means and a second pivot pin axially aligned with said first pivot pin connecting said second arm to said ball nut means.

18. The assembly of claim 17, wherein said pivot means includes a third pivot pin connecting a first portion of said bearing housing to said mounting bracket and a fourth pivot pin axially aligned with said third pivot pin connecting a second portion of said bearing housing to said mounting bracket, said second portion being disposed in longitudinal alignment with said first portion.

19. The assembly of claim 18, wherein said first and second pivot pins are disposed along a line generally parallel with the axis of rotation of said rotary plug valve; and said third and fourth pivot pins are disposed along a line generally parallel the axis of rotation of said rotary plug valve.

20. The assembly of claim 19, wherein said ball screw assembly means having an axis of rotation disposed in a plane that is generally perpendicular to a plane including the axis of rotation of said rotary plug valve.

21. The assembly of claim 20, wherein said ball nut means includes a ball screw nut in operative association with said ball screw shaft.

22. The assembly of claim 21, wherein said first and second pivot pins are connected to said ball screw nut.

23. The assembly of claim 22, wherein said mounting bracket includes (i) a flange adapted to be secured to said rotary plug valve; (ii) a first support extending generally perpendicularly from said flange; (iii) a second support extending generally perpendicularly from said flange and spaced from said first support an adequate distance to allow rotation of said bearing housing therebetween; and (iv) a cross member having one end secured to said first support and a second end secured to said second support.

24. The assembly of claim 23, wherein said third pivot pin is secured to said cross member and said fourth pivot pin is secured to said flange.

25. The assembly of claim 24, including a ball screw shaft cover secured to one end of said ball nut means for protecting a portion of said ball screw shaft; and a ball screw shaft bellows secured to the other end of said ball nut means for protecting another portion of said ball screw shaft.

26. The assembly of claim 15, wherein said actuating means is a handle secured to one end of said ball screw shaft for facilitating rotation of said ball screw shaft.

27. The assembly of claim 26, wherein said handle means is a wheel having spokes.

28. The assembly of claim 15, including indicator means disposed on said lever means to indicate the position of said rotary plug valve.

29. A method of actuating a rotary plug valve comprising:

providing a rotary plug valve assembly including a rotary plug valve having mounted thereon a rotary plug valve actuator, said rotary plug actuator comprising (i) a mounting bracket removably secured to a portion of said rotary plug valve, (ii) ball screw assembly means, said ball screw assembly means including (a) a bearing housing pivotably mounted to said mounting bracket by pivot means connecting said mounting bracket to said bearing housing; (b) a ball screw shaft journalled in said bearing housing; (c) a ball nut means, said ball nut means moving axially on said ball screw shaft when said ball screw shaft is rotated; and (d) actuating means for rotating said ball screw shaft, whereby when said actuating means is actuated, said ball screw assembly means pivots at said pivot means, and (iii) lever means pivotably mounted to said ball nut means for converting said axial movement of said ball nut means to rotary movement of said lever means as a result of said ball screw assembly means being pivoted about said pivot means within said mounting bracket; and rotating said ball screw shaft by means of said actuating means such that said rotary plug valve is actuated.

30. The method of claim 29, including employing as said actuating means a handle to facilitate rotating said ball screw shaft.

31. The method of claim 30, including providing indicator means on said lever means to visually indicate the position of said rotary plug valve.

* * * * *